(12) United States Patent
Belliveau

(10) Patent No.: US 7,207,599 B2
(45) Date of Patent: Apr. 24, 2007

(54) CROSS SHAFT FOR SEMITRAILER LANDING GEAR

(76) Inventor: Joseph Michel Noel Belliveau, 891 Chartersville Road, Dieppe, New Brunswick (CA) E1A 1K7

( * ) Notice: Subject to any disclaimer, the term of this patent is extended or adjusted under 35 U.S.C. 154(b) by 0 days.

(21) Appl. No.: 10/992,654

(22) Filed: Nov. 22, 2004

(65) Prior Publication Data

US 2005/0110261 A1   May 26, 2005

(30) Foreign Application Priority Data

Nov. 24, 2003   (CA)   .................................... 2449405

(51) Int. Cl.
*B60S 9/02* (2006.01)
(52) U.S. Cl. .................. 280/766.1; 280/763.1
(58) Field of Classification Search ............ 280/766.1, 280/765.1, 763.1, 764.1, 762, 475; 254/419, 254/424, 425, 103
See application file for complete search history.

(56) References Cited

U.S. PATENT DOCUMENTS

| 1,524,083 | A | * | 1/1925 | Clement .................. 254/419 |
| 2,232,187 | A | | 2/1941 | Reid |
| 2,417,619 | A | * | 3/1947 | Seyferth .................. 254/419 |
| 2,875,980 | A | * | 3/1959 | Karl ......................... 254/419 |
| 2,885,220 | A | | 5/1959 | Dalton |
| 3,007,677 | A | * | 11/1961 | Dalton ...................... 254/419 |
| 3,201,086 | A | | 8/1965 | Dalton |
| 3,241,815 | A | * | 3/1966 | Evan ......................... 254/419 |
| 3,253,839 | A | * | 5/1966 | Warren ..................... 254/419 |
| 3,454,251 | A | * | 7/1969 | Dye ........................ 280/765.1 |
| 3,518,890 | A | | 7/1970 | Eastman |
| 3,596,877 | A | | 8/1971 | Eastman |
| 3,618,969 | A | * | 11/1971 | Glassmeyer ............. 280/149.2 |
| 3,632,086 | A | | 1/1972 | Mai |
| 3,658,359 | A | * | 4/1972 | Claflin et al. ............... 254/419 |
| 3,825,095 | A | * | 7/1974 | Clark ...................... 280/766.1 |
| 3,861,648 | A | | 1/1975 | Glassmeyer |
| 3,880,403 | A | | 4/1975 | Glassmeyer |
| 4,004,830 | A | | 1/1977 | Belke |
| 4,020,651 | A | | 5/1977 | Callies |
| 4,205,824 | A | | 6/1980 | Mai |
| 4,402,526 | A | | 9/1983 | Huetsch |
| 4,595,383 | A | | 6/1986 | Nienhaus |
| 4,784,063 | A | * | 11/1988 | Theurer et al. .......... 280/766.1 |
| 5,192,102 | A | * | 3/1993 | Mertens et al. .......... 280/766.1 |
| 5,387,071 | A | * | 2/1995 | Pinkston .................. 280/765.1 |
| 5,538,225 | A | | 7/1996 | VanDenberg |
| 5,730,455 | A | * | 3/1998 | Varnum et al. .......... 280/763.1 |

(Continued)

FOREIGN PATENT DOCUMENTS

CA        958907        12/1974

*Primary Examiner*—Hau Phan
(74) *Attorney, Agent, or Firm*—Palmer C. DeMeo; Mario Theriault

(57) ABSTRACT

A landing gear having a telescopic cross shaft extending between the cylindrical stub shafts protruding from both screw jacks thereof. The telescopic cross shaft is made of square structural tubing. The telescopic cross shaft has a pair of end-casing members and a central-stem member. The end-casing members have a combined length of less than a distance between the legs of the landing gear. The end-casing members are slidably engaged over both ends of the central-stem member with loose-fit connections. The end-casing members are also respectively mounted over the stub shafts of the landing gear with loose-fit connections.

5 Claims, 6 Drawing Sheets

U.S. PATENT DOCUMENTS 6,099,016 A * 8/2000 Peveler .................... 280/475
6,623,035 B1 * 9/2003 Schneider ............... 280/766.1
6,846,016 B2 * 1/2005 VanDenberg et al. .... 280/763.1

* cited by examiner

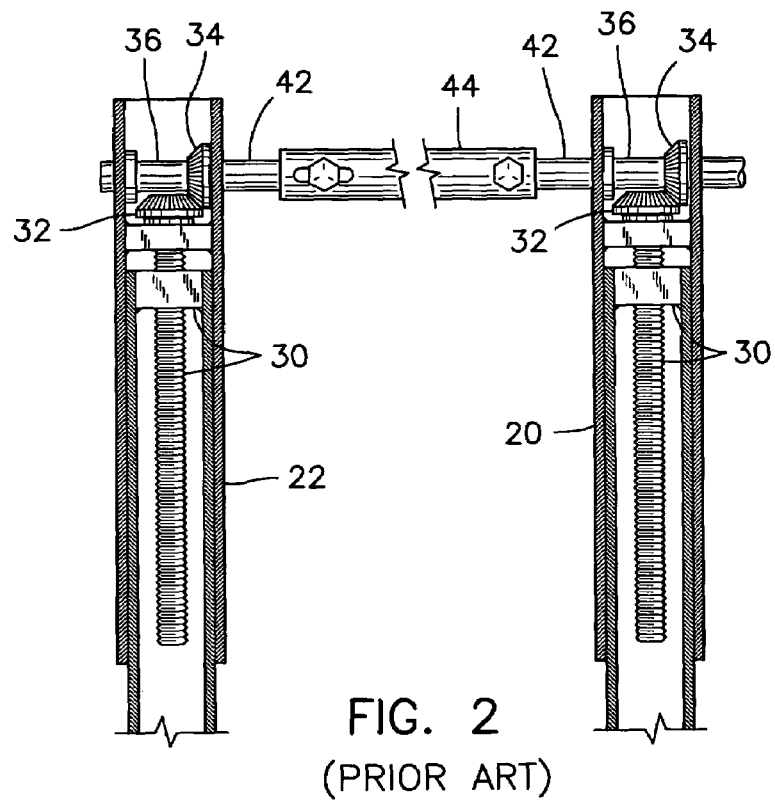
FIG. 2
(PRIOR ART)
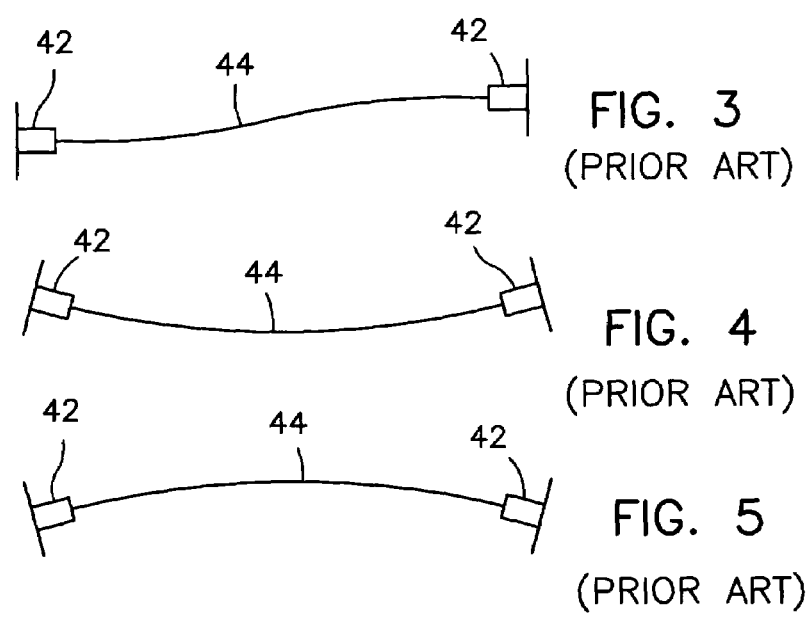
FIG. 3
(PRIOR ART)
FIG. 4
(PRIOR ART)
FIG. 5
(PRIOR ART)

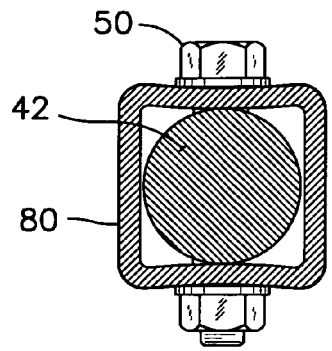 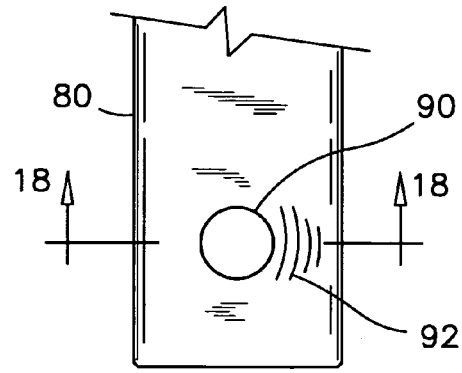
FIG. 14  FIG. 17
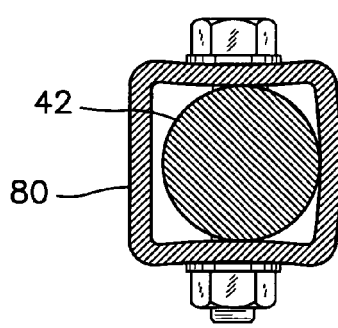 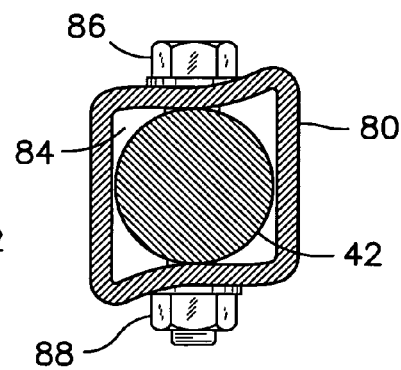
FIG. 15  FIG. 16
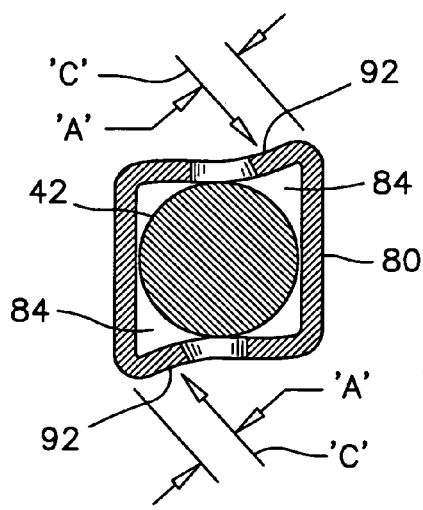
FIG. 18

CROSS SHAFT FOR SEMITRAILER LANDING GEAR

FIELD OF THE INVENTION

This invention pertains to landing gears for highway transport trailers. More particularly, this invention pertains to a cross shaft extending between the legs of the landing gear under a semitrailer.

BACKGROUND OF THE INVENTION

A semitrailer is not always parked on even ground, and therefore the loads carried by the two legs of a landing gear are not always equal, and the two legs of the landing gear are not always extending in a perfect parallel alignment. Also, when a loaded trailer is raised on its landing gear, the leg on the far side of the crank lags behind the leg on the near side because of the torsional deflection in the cross shaft. It is believed that this torsional deflection in the cross shaft together with uneven parking surfaces contribute to cause an unbalance in the loads carried by the two legs of a landing gear and a deflection in the frame supporting the landing gear to the trailer.

It is believed that when the legs of a landing gear do not extend in a perfect parallel alignment, an axial tension or a compression stress is generated in the cross shaft, causing gear friction inside the telescoping mechanisms of the legs. In these cases, a larger than normal torque is required to raise or to lower the telescopic legs of the landing gear. It is believed that these large torques have been the major cause of failure of cross shafts on landing gears.

Another contributing factor to explain the failures of cross shafts on the landing gears of semitrailers is believe to be directly related to the handling of trailers. Generally, a highway trailer belongs to a pool of trailers, and is often hauled by several trucks during a same week. A trailer is normally dropped off by one truck at a depot, for unloading and reloading, and picked up later by another truck for delivery to a new destination. A trailer is also often hauled along one segment of a delivery route by one truck and along a next segment by another truck.

The fifth wheels of tractor trucks are not all at the same height, and it is common for a truck operator to try to hitch a trailer that sits too low for the fifth wheel of his/her truck. When the trailer fails to reach the fifth wheel, the truck moves ahead causing the trailer to slide down on the rails of the truck and to fall back on its landing gear. The leg on the crank side of the landing gear is locked in place by the gearing system of the crank. However, the leg on the far side of the crank, that is the passenger-side leg, is held in place by the stiffness of the cross shaft. Again, if the ground is uneven and higher under the passenger-side leg of the landing gear, the jerk applied to this leg is transmitted directly to the cross shaft, often breaking the cross shaft.

The cross shaft between the legs of a landing gear of the prior art is made of a continuous cylindrical pipe, and therefore, one of the legs of the landing gear must be removed to replace a broken cross shaft. The replacement of a cross shaft represents substantial repair expenses, a loss of revenue for the truck operator, a loss of productivity for the trailer and a missed delivery schedule for the recipients of the goods contained in the trailer.

Examples of landing gears having continuous cylindrical cross shafts are illustrated and described in the following documents:

U.S. Pat. No. 2,232,187 issued to F. M. Reid on Feb. 18, 1942;
U.S. Pat. No. 2,885,220 issued to T. B. Dalton on May 5, 1959;
U.S. Pat. No. 3,201,086 issued to T. B. Dalton on Aug. 17, 1965;
U.S. Pat. No. 3,518,890 issued to B. Eastman on Jul. 7, 1970;
U.S. Pat. No. 3,596,877 issued to B. Eastman on Aug. 3, 1971;
U.S. Pat. No. 3,632,086 issued to E. Mai on Jan. 4, 1972;
U.S. Pat. No. 3,861,648 issued to J. J. Glassmeyer on Jan. 21, 1975;
U.S. Pat. No. 3,880,403 issued to J. J. Glassmeyer on Apr. 29, 1975;
U.S. Pat. No. 4,004,830 issued to J. T. Belke on Jan. 25, 1977;
U.S. Pat. No. 4,205,824 issued to E. Mai on Jun. 3, 1980;
U.S. Pat. No. 4,402,526 issued to L. C. Huetsch on Sep. 6, 1983;
U.S. Pat. No. 5,538,225 issued to E. VanDenberg on Jul. 23, 1996.

Because of all the expenses and inconveniences associated to the replacement of a broken cross shaft, it is believed that a need exists for a cross shaft for a landing gear that can resist uneven and shock loads and that can be installed quickly without having to remove one leg of the landing gear.

SUMMARY OF THE INVENTION

In the present invention, however, there is provided a landing gear having a telescopic cross shaft with at least four loose-fit joints therein whereby axial and bending stresses on the cross shaft are substantially reduced. The telescopic cross shaft is made of square hollow tubing and the engagement thereof over the cylindrical stub shafts of the landing gear produces voids within the tubes and excessive material around the perimeter of the tube to better absorb torsional stresses.

More particularly, the present invention pertains to a landing gear having a telescopic cross shaft extending between the cylindrical stub shafts protruding from both screw jacks of the landing gear. The telescopic cross shaft is made of a pair of hollow square end-casing members and a hollow square central-stem member. The end-casing members have a combined length of less than a distance between the legs of the landing gear. The end-casing members are slidably engaged over both ends of the central-stem member with loose-fit connections. The end-casing members are also respectively mounted over the cylindrical stub shafts of the landing gear with loose-fit connections.

The square tubing has a cross-section perimeter that is much longer than the circumference of the cylindrical stub shaft on which it is engaged. This excess length represents excess material that is able to cave in and bundle up for absorbing torsional stress without breaking the cross shaft. Also because of this excess material, the shear stresses on the extreme fibres of the tubing are substantially reduced as compared to the stress on a tight-fit hollow cylindrical tube.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Several drawings are included to illustrate the structure of a prior art landing gear so that one can obtain a better appreciation of the novelty and inventiveness of the cross shaft according to the present invention. The drawings also illustrate four embodiments of the cross shaft according to the present invention, in which like numerals denote like parts throughout the several views. In the accompanying drawings;

FIG. 2 is a cutaway front view of both legs in a landing gear of the prior art;

FIG. 3 is a schematic illustration of the bending of the cross shaft when the legs of a landing gear of the prior art rest on an uneven ground;

FIGS. 4 and 5 are schematic illustrations of the bending of the cross shaft when the legs of a landing gear of the prior art are diverting from each other, and converging toward each other, respectively;

FIG. 14 is a cross-section view through an end of the telescopic cross shaft according to the first preferred embodiment of the present invention, and through a typical stub shaft of a landing gear;

FIGS. 15 and 16 are cross-section views through an end of the telescopic cross shaft according to the first preferred embodiment after having been subjected to excessive bending and torsional stresses respectively;

FIG. 17 is a partial top view of an end of the telescopic cross shaft according to the first preferred embodiment that has been subjected to excessive torsional stresses;

FIG. 18 is a cross-section view through an end of the telescopic cross shaft as seen along line 18—18 in FIG. 17;

DESCRIPTION OF THE PREFERRED EMBODIMENTS

Figure 1:
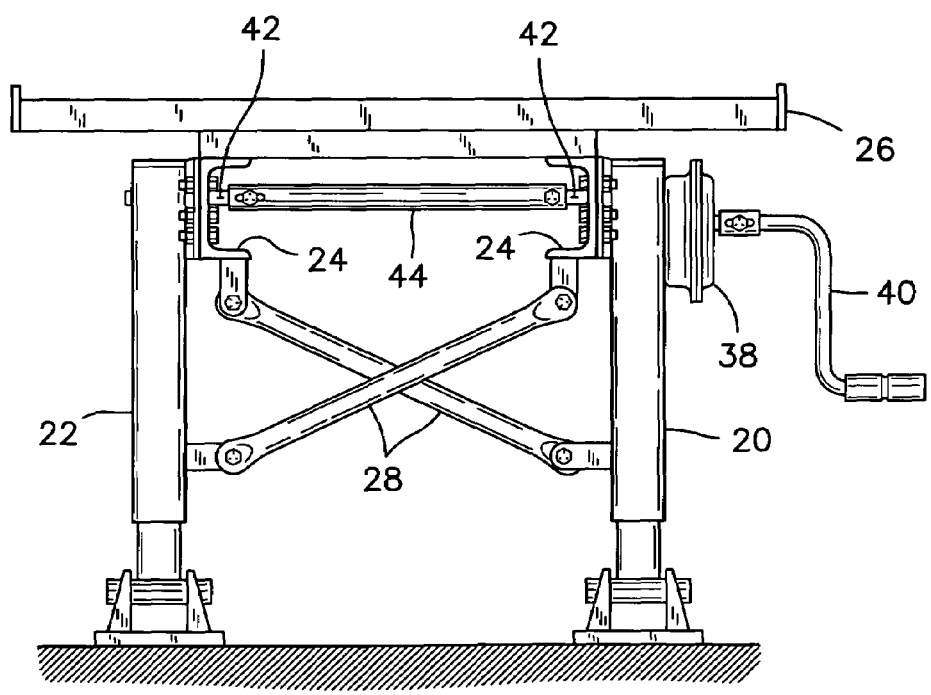
FIG. 1 is a front view of a landing gear of the prior art.

While this invention is susceptible of embodiments in many different forms, there are shown in the drawings and will be described in details herein four specific embodiments, with the understanding that the present disclosure is to be considered as examples of the principles of the invention and is not intended to limit the invention to the embodiments illustrated and described.

Referring firstly to FIGS. 1 and 2, a semitrailer landing gear comprises a pair of telescopic legs that are referred to herein as the driver side leg 20 and the passenger side leg 22. These legs are fastened to the frame 24 of the semitrailer 26 and may be retained to each other by cross braces 28.

Although only certain types of highway trailers have narrow frame rails as illustrated by label 24, this example is used herein for convenience. It will be appreciated that the other types of trailers also have deflection in the mounting structure of a landing gear, and therefore the following description also applies to these other trailers.

Each of the legs 20, 22 extends and retracts by means of a screw jack 30 on which is mounted a crown gear 32. The crown gear 32 is driven by a pinion gear 34 mounted on a transverse shaft 36. The transverse shaft 36 on the driver side leg 20 is integrated into a gear box 38 which is driven by a crank 40. The transverse shafts 36 have respective portions thereof extending toward each other outside the respective legs 20, 22. These shaft portions are referred to herein as the stub shafts 42. In a landing gear of the prior art, both stub shafts 42 are joined to each other by a continuous hollow cylindrical cross shaft 44.

It will be appreciated that the frame 24 of a semitrailer is relatively flexible but resilient to accommodate the curves and crowns of roads. This frame 24 is flexible to accommodate any driving surface irregularities without breaking. Therefore, it will also be appreciated that when the legs of a landing gear do not rest on an even ground surface, the frame 24 of the semitrailer twist slightly, and the cross shaft 44 of the landing gear is subjected to bending stresses which cause it to deform and take a shape as illustrated in an exaggerated mode in FIG. 3.

When the cross braces 28 on a landing gear are loose or broken, the legs 20, 22 of the landing gear can sometime divert away from each other or converge toward each other slightly, causing the cross shaft 44 to flex as shown in exaggerated modes in FIGS. 4 and 5.

In all three cases shown in FIGS. 3, 4 and 5, an axial tension or compression force is applied to the cross shaft in addition to a bending moment. In the situations illustrated in FIGS. 3 and 4, an axial tension force is set in the cross shaft 44. This axial tension force is transmitted to the pinion gears 34, causing the pinion gear 34 in the driver side leg 20 to climb onto or otherwise jam against the crown gear 32 on the screw jack 30 of that leg 20. In the situation illustrated in FIG. 5, an axial compression force is set in the cross shaft 44. This axial compression force is transmitted to the pinion gears 34, causing the pinion gear 34 on the passenger side leg 22 to climb onto or otherwise jam against the crown gear 32 on the screw jack 30 of that leg 22. In both cases, a excessive friction is generated between one of the pinions 34 and its respective crown gear 32, thereby increasing the torque required to operate one of the screw jacks 30.

Figure 6:
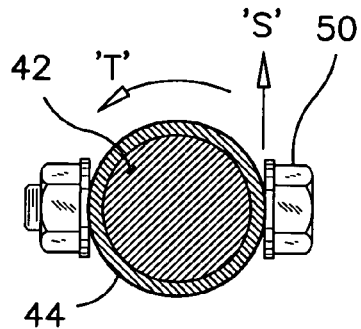
FIG. 6 is a cross-section view through the cross shaft on a landing gear of the prior art.

Referring now to FIGS. 6–9, the inherent drawback with the cross shafts 44 of the landing gears of the prior art will be explained. The cross shafts 44 of the prior art are made of cylindrical tubes, as illustrated in FIG. 6. The inside diameter of the tube 44 is substantially a same dimension as the outside diameter of the stub shaft 42. The cross shaft 44 is locked to the stub shaft 42 by a bolt 50 passing through the cross shaft 44 and the stub shaft 42. When a torque 'T' is applied to the cross shaft 44, the stress on the cross shaft is substantially tangential to the surface of the cross shaft 44 as illustrated by arrow 'S' in FIG. 6. In other words, the torsion stress on the cross shaft 44 is translated into a tension and shear stress in the extreme fibres of the material of the cross shaft. The extreme fibres referred to herein are those fibres located farthest from the axis of rotation of the shaft.

In a typical new landing gear, both ends of the cross shaft 44 have a pair of aligning slots 52 for receiving the bolts 50, for mounting the cross shaft to the stub shafts 42. In the after market cross shafts, only one pair of slots 52 are provided on one end of the cross shaft, as the installer must cut the cross shaft and drill a hole at the appropriate location in the other end. Therefore it is often the case where the bolt 50 extends close to the end of the slot 52 as illustrated on FIG. 7, because the cross shaft 44 was cut too short, because of deformation in the landing gear, because of contraction of the cross shaft in cold weather, or because of previous deformation in the cross shaft, beyond the yield strength thereof.

It has been observed that because the cross shaft 44 has a same inside diameter as the outside diameter of the stub shaft 42, bending stresses 'M' in the cross shaft 44 cause bulges 54 to appear along the side thereof. These bending stresses 'M' also cause funnel-like deformations 56 to appear along the open end thereof. It has also been observed that because the bolt 50 extends through a slot 52, an excessive torque on the cross shaft 44 causes the slots to stretch out transversely, substantially as shown by the stress point 58 in FIG. 8.

It will be appreciated that the weak point in the cross shaft 44 of the prior art in the case of a combined torsion stress 'T', bending stress 'M' and axial tension or compression force 'P' is within the segment 60 between the end of the slot 52 and the open end of the cross shaft 44.

Figure 9:
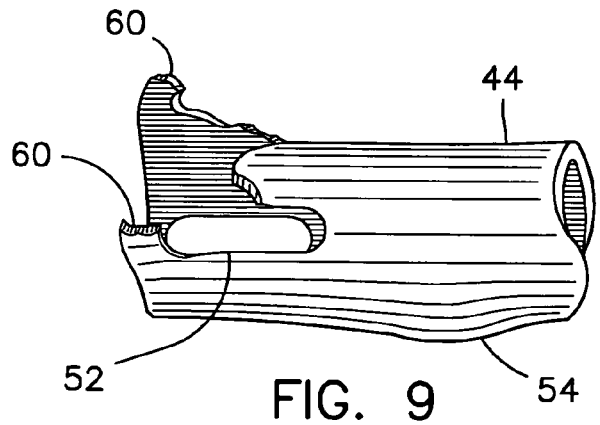

Most failures of cross shafts that were observed, have a break that was initiated at this segment 60, as illustrated in FIG. 9, indicating excessive axial and circumferential stresses in that segment 60.

Figure 10:
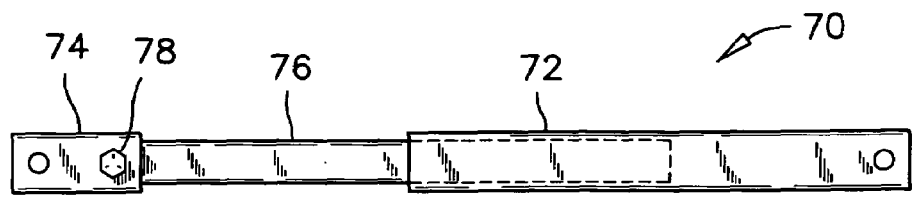
FIGS. 10, 11, 12 and 13 are side views of telescopic cross shafts according to the first, second, third and fourth preferred embodiments of the present invention, respectively.

Referring now to FIG. 10, the telescopic cross shaft 70 according to the first preferred embodiment of the present invention is illustrated therein. The first preferred telescopic cross shaft 70 is made of hollow structural steel (HSS) or other metal having a structural grade known as ASTM A-500 or equivalent.

The cross shaft 70 is made of three pieces. A first end-casing member 72 has inside dimensions to enclose the stub shaft 42 on one leg of the landing gear. A second end-casing member 74 has inside dimensions to enclose the stub shaft 42 on the opposite leg of the landing gear. A central-stem member 76 has dimension to slide freely inside the first and second end-casing members 72, 74. The first end-casing member 72 extends about half the length or less of the full length of the cross shaft 70. The second end-casing member 74 extends about 4 to 6 inches. The central-stem member 76 spans between and extends inside the first and second end-casing members 72, 74. The central-stem member 76 extends into the first end-casing member 72 over a distance of about 6–12 inches or more.

The first and second end-casing members 72,74 are preferably made of HSS having an outside dimension of 1¼ inches by a wall thickness of 0.100 inch. The central-stem member 76 preferably has an outside dimension of 1.00 inch with a wall thickness of 0.125 inch.

It will be appreciated that the clearance between the first end-casing member 72 or the second end-casing member 74 and the central-stem member 76 is about 0.050 inch. This clearance provides a very loose sliding fit between the central-stem member 76 and the first and second end-casing members 72, 74. The central-stem member 76 is retained to the second end-casing member 74 by means of a single bolt 78 extending through both the second end-casing member 74 and the central-stem member 76. The preferred cross shaft 70 is also affixed to both stub shafts 42 by means of bolts 50 as explained before.

The landing gear on which the preferred cross shaft 70 is installed has cylindrical stub shafts 42 each having a diameter of 1.00 inch and a protruding length of between about 2 to 3 inches and sometimes much more. Therefore, the loose sliding fit mentioned above is also found in the mounting of the cross shaft 70 to both stub shafts 42.

The advantages of the telescopic cross shaft 70 according to the first preferred embodiment of the present invention include that fact that axial stress therein is completely eliminated. The telescopic arrangement of the cross shaft 70 is also advantageous for eliminating the need for a slot in the first or second end-casing member 72, 74 to receive a mounting bolt 50. Further, the preferred cross shaft 70 is easily and quickly installed in replacement of a broken shaft 44 of the prior art without removing one of the legs of the landing gear.

The loose fit of the preferred cross shaft 70 over both stub shafts 42 and within the mounting of its central-stem member 76 to the first and second end-casing members 72, 74 provide flexibility to absorb a substantial misalignment of the stub shafts 42, without causing any bending stress on the cross shaft 70 itself. These and other advantages will be better explained by making references to FIGS. 14–18. For convenience, the 1¼ inch HSS of the first and second casing members 72, 74 are also referred to herein as the square tubes 80.

Figure 7:
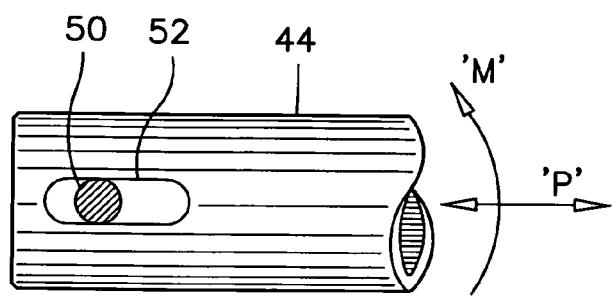
FIGS. 7, 8 and 9 are partial side views of one end of the cross shaft on a landing gear of the prior art, showing various stages during a typical failure of this cross shaft.
Figure 8:
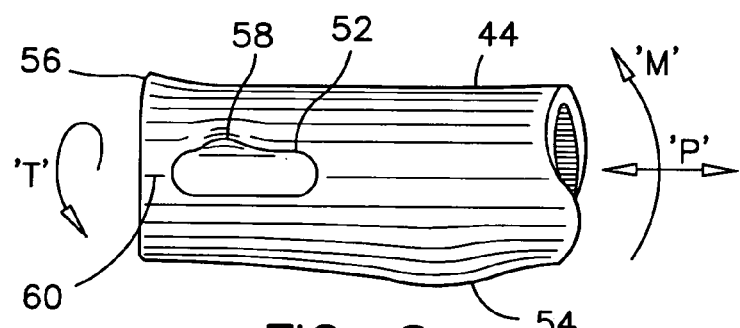

As mentioned before the square tubes 80 are mounted to the cylindrical stub shafts 42 with a loose mounting fit, as illustrated in FIG. 14. When a bending force 'M' is applied to the cross shaft 70 in a similar manner as illustrated in FIGS. 7 and 8, the wall of the square tube 80 is easily flexed outwardly as indicated by the deformation 82 in FIG. 15 to absorb this bending force. Because of the excess material in the square tube 80, voids 84 are created between the stub shaft 42 and the walls of the square tube 80. These voids 84 are advantageous for absorbing torsion stresses in the cross shaft 70 as it will be explained below.

Referring particularly to FIGS. 16–18, it has been found that an excessive torsion stress in the cross shaft 70 according to the first preferred embodiment causes the walls of the square tube 80 under the bolt head 86 and under the nut 88 of the bolt 50 to cave in and bundle up around the mounting hole 90. Because of this type of deformation, it has been found that an excessive torsion force on the cross shaft 70 causes the circumferential stresses 'C' to be directed inwardly relative to the extreme fibres of the square tube 80. It has been found that the force on the square tube 80 is concentrated in a sector 92 around the bolt hole 90. It has further been found that the region of stress concentration 92 is at a distance 'A' of about ¼ inch from the extreme fibres of the square tube 80, thereby preventing shearing the wall of the square tube 80.

It has been found also that during such deformation of the square tube 80 the voids 84 between the stub shaft 42 and the square tube 80 are reduced in size. It is believed that because of the excess material and the voids 84 in the square tube 80, the square tube can absorb more bending and torsional stresses than a cylindrical tube of a same inside diameter and wall thickness.

The cross shaft 70 according to the first preferred embodiment of the present invention has been tested thoroughly and used successfully in the same installations where cylindrical tubes 44 failed repeatedly.

Figure 19:
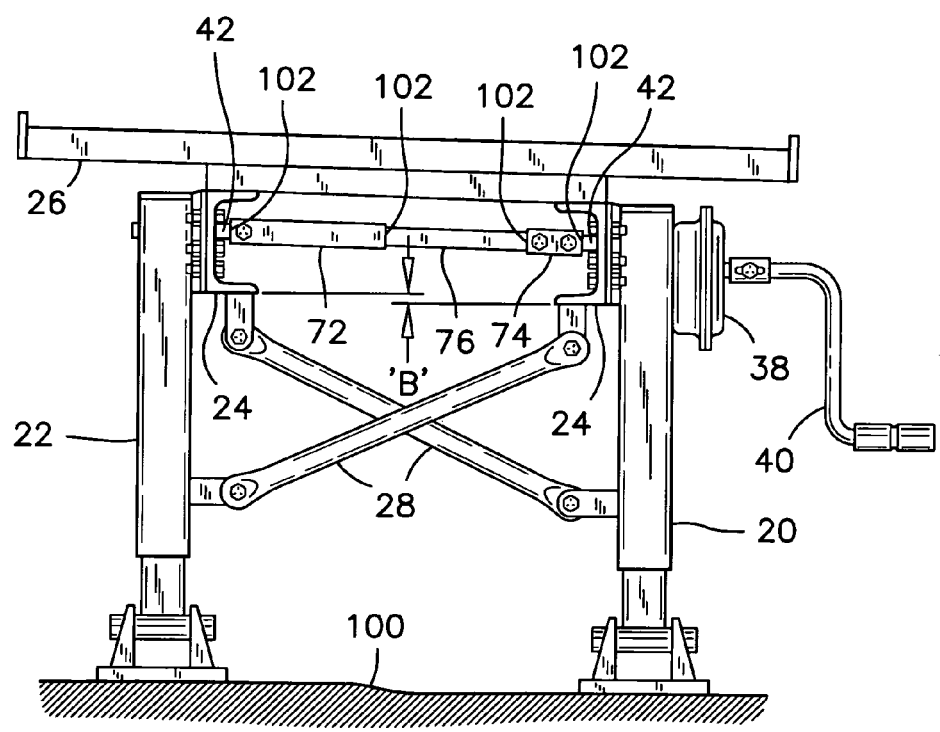
FIG. 19 is a front view of a semitrailer landing gear having a cross shaft according to the first preferred embodiment of the present invention mounted thereto.

Referring now to FIG. 19, a landing gear is shown with the two legs thereof resting on an uneven ground surface 100, with the passenger side leg 22 being higher than the driver side leg 20 by a substantial distance 'B'. As explained herein before, the first preferred cross shaft 70 has a telescoping arrangement to eliminate any axial force on the stub shafts 42 and to prevent jamming the pinion gears 34 against the crown gears 32 of the screw jacks 30. The first preferred cross shaft 70 has four loose-fit engagements 102 therein to absorb and eliminate any bending stress thereon from the uneven ground surface 100. The first preferred cross shaft 70 is made of square tubing having excess material and voids therein around the stub shafts 42 to better absorb torsion loads thereon, and to reduce or eliminate any shear stresses on its extreme fibres.

Figure 11:
Figure 12:
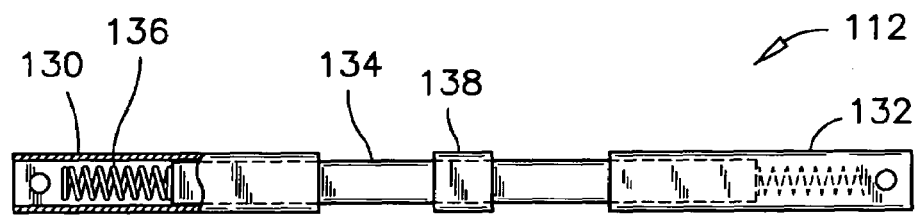
Figure 13:
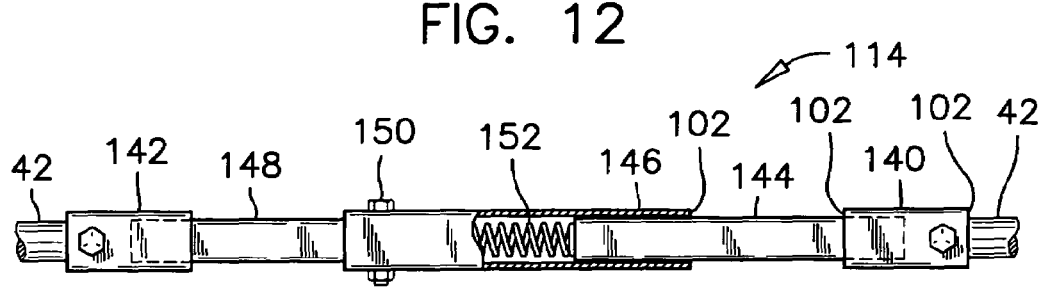

Referring back to FIGS. 11, 12 and 13, the cross shafts according to the second, third and fourth preferred embodiments 110, 112 will be described.

The cross shaft 110 according to the second preferred embodiment is made of two end-stem sections 120, 122 extending inside a central-casing section 124. The end-stem sections are made of 1¼ inch square HSS tubing, and the central-casing section 124 is made of 1½ inch square HSS tubing. All three sections have a wall thickness of 0.100 inch.

The cross shaft 112 according to the third preferred embodiment has two end-casing sections 130, 132 that are made of 1¼ inch square HSS tubing having a wall thickness of 0.100 inch, and a central-stem section 134 telescopically mounted inside the end-casing sections 130, 132. The central-stem section 132 is made of 1 inch square HSS having a wall thickness of 0.125 inch.

In use, the central-stem section 134 is kept centred inside the end-casing sections 130, 132 by means of a pair of compression springs 136 fastened respectively to the ends of the central-stem section 134 and extending inside the end-casing sections 130, 132 against the stub shafts 42 of the screw jacks 30. This particular embodiment of the present invention further has an optional central band 138 affixed to the central-stem section 134 to limit the movement of the central-stem section 134 inside the end-casing sections 130, 132 in the event where the cross shaft 112 would be inadvertently installed without one or both springs 136.

The cross shaft according to the fourth preferred embodiment 114 comprises a pair of coupling members 140, 142 which are permanently affixed to the stub shafts 42 by bolts for example. The telescoping portion of the cross shaft has a stem member 144 slidably mounted in one end of a casing member 146 and extending into the first coupling member 140. A stem extension 148 is affixed to the other end of the casing member 146 by a bolt 150 for example, and extends into the second coupling member 142. A spring 152 is mounted inside the casing member 146 between the stem member 144 and the stem extension 148 for maintaining the stem member 144 and the stem extension 148 apart from each other and into their respective engagement with the coupling members 140, 142. It will be appreciated that the telescopic cross shaft of the fourth preferred embodiment 114 has six loose-fit connections 102 therein to better absorb misalignments between the stub shafts 42. The fourth preferred telescopic cross shaft 114 is made with the same materials as for the cross shaft of the first preferred embodiment 70.

As to other manner of usage and operation of the present invention, the same should be apparent from the above description and accompanying drawings, and accordingly further discussion relative to the manner of usage and operation of the invention would be considered repetitious and is not provided.

While four embodiments of the present invention have been illustrated and described herein above, it will be appreciated by those skilled in the art that various modifications, alternate constructions and equivalents may be employed without departing from the true spirit and scope of the invention. For example, although the cross shaft according to the preferred embodiments were illustrated and described as square tubes, it is believed that other hollow polygonal structural members such as hexagonal members would also provide advantageous results. Therefore, the above description and the illustrations should not be construed as limiting the scope of the invention which is defined by the appended claims.

I claim:

1. A landing gear for a semitrailer, comprising;
a pair of spaced-apart telescopic legs each having a jack therein, a stub shaft protruding therefrom, and means for transmitting torque between said stub shaft and said jack; said stub shafts in both said legs pointing toward each other and each having a circular cross section;
a tubular cross shaft extending between said stub shafts for transmitting torque between said jacks; said cross shaft having a square cross section; and
a pair of torque-transmitting connections, each comprising an engagement of an end portion of said cross shaft over one of said stub shafts and a bolt extending diametrically through said end portion of said cross shaft and said one of said stub shafts, wherein said end portion of said cross shaft has a deformation therein, and wherein said deformation is a concave curvature in two opposite flat walls in said tubular cross shaft.

2. The landing gear as claimed in claim 1, wherein each of said torque-transmitting connections comprises a loose fit mounting between said cross shaft and said stub shaft.

3. The landing gear as claimed in claim 2, wherein said bolt has a bolt head and a nut thereon, and said bolt head and said nut have a common diameter which is smaller that a width of said cross shaft.

4. The landing gear as claimed in claim 1, wherein said tubular cross shaft has a telescopic structure and at least three loose fitting connections therealong.

5. A landing gear for a semitrailer, comprising;
a pair of spaced-apart telescopic legs each having a jack therein, a stub shaft protruding therefrom, and means for transmitting torque between said stub shaft and said jack; said stub shafts in both said legs pointing toward each other and each having a circular cross section;
a tubular cross shaft extending between said stub shafts for transmitting torque between said jacks, said cross shaft having a telescopic structure comprising a pair of hollow end-casing members and a hollow central-stem member, with said hollow end-casing members having a combined length of less than a distance between said stub shafts and being slidably engaged over said hollow central-stem member and said stub shafts; and
a compression spring mounted inside one of said hollow end-casing members between said hollow central-stem member and one of said stub shafts.

* * * * *